P. B. DELANY.
AUTOMATIC TELEGRAPHY.
APPLICATION FILED DEC. 15, 1896.
899,209.
Patented Sept. 22, 1908.
3 SHEETS—SHEET 3.
Fig. 3,
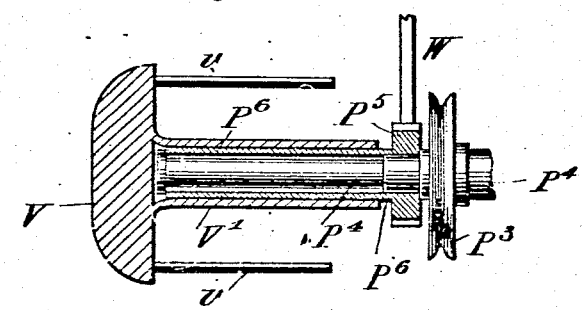
Fig. 4.
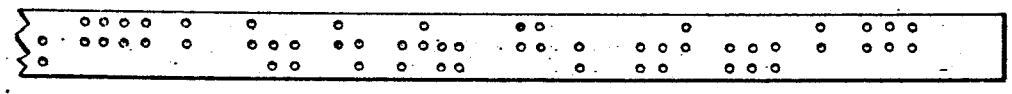
T H E   W A . Y   I T   G  .O  E  S
Witnesses
Patrick B. Delany, Inventor
By his Attorneys

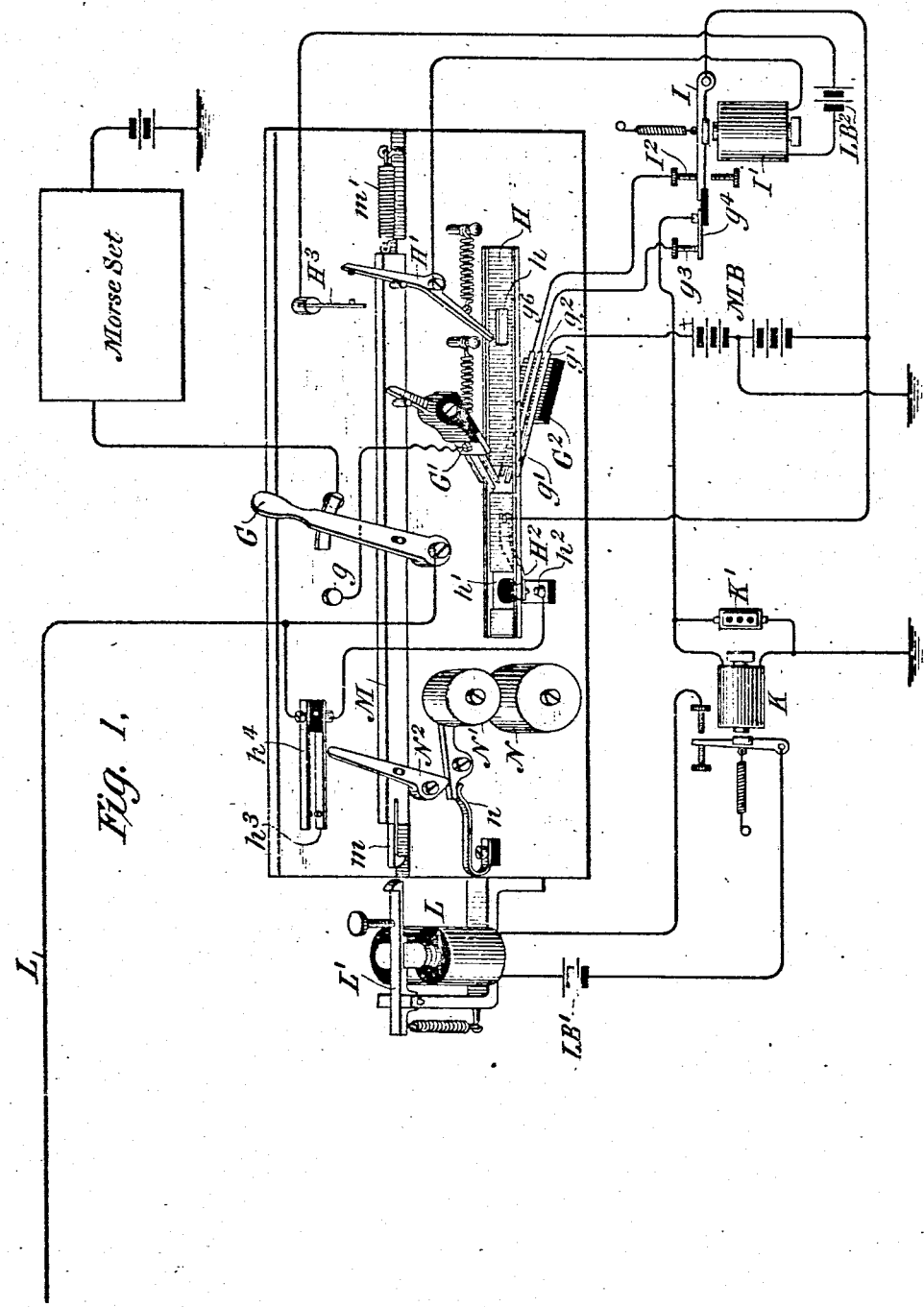

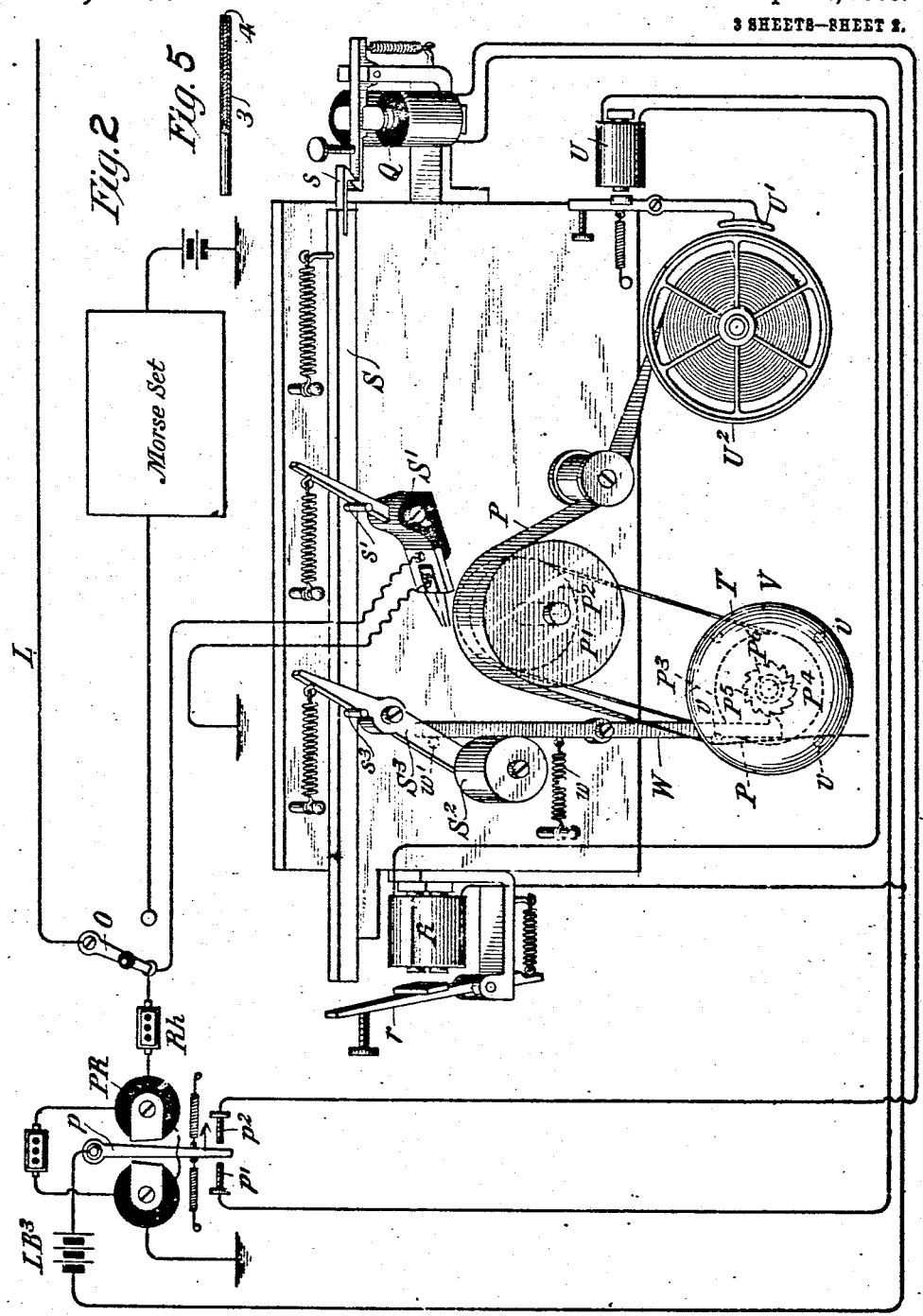

UNITED STATES PATENT OFFICE.

PATRICK BERNARD DELANY, OF SOUTH ORANGE, NEW JERSEY, ASSIGNOR, BY MESNE ASSIGNMENTS, TO THE TELEPOST COMPANY OF MAINE.

AUTOMATIC TELEGRAPHY.

No. 899,209.

Specification of Letters Patent.

Patented Sept. 22, 1908.

Application filed December 15, 1896. Serial No. 615,796.

*To all whom it may concern:*

Be it known that I, PATRICK BERNARD DELANY, a citizen of the United States, residing at South Orange, in the county of Essex and State of New Jersey, have invented certain new and useful Improvements in Automatic Telegraphy, of which the following is a specification.

This invention relates to automatic or machine telegraphy employing a perforated tape at the sending end and a recording device at the receiving end. In previous patents, I have shown a transmitting tape with two rows of holes, one for dots and the other representing dashes, one row sending impulses from the positive, the other from the negative pole of the battery. I have also shown and described apparatus for preparing and transmitting from this tape, and the method of receiving the signals on chemically prepared tape, the dots in a single line and the dashes in duplicate lines, all of which may be readily understood by reference to my patents. I have also shown a method of discharging the line to earth after each impulse. This is accomplished by the employment in a local circuit controlled by the automatic transmitter, of electro-magnetic transmitters which by operation of their armature levers connect the line to earth after each impulse in a manner well understood. This plan works very well on cables or other difficult circuits admitting of comparatively slow signaling, but for rapid working over land lines the electro-magnetic transmitters would be too slow. In order therefore to discharge the line after each signal, without the use of electro-magnetic or mechanical movements, I have invented an arrangement of perforations which renders this entirely practicable at the highest speed of transmission over any circuit. The transmitting tape employed has three rows of perforations, one for transmitting dots, one for dashes, and a third for grounding the line having as many perforations in it as there are perforations in both the other rows.

The transmitter has three brushes on each side of the tape, the central pair being located in the track of the middle row of perforations and adjusted so that their ends are a distance equal to one perforation behind the others. While an impulse of either polarity is being sent from a signaling perforation the middle brushes are separated by the tape and only come into contact through a perforation in the middle row when either of the signaling contacts has passed over a perforation. The three upper brushes are electrically connected to the line and the middle brush of the lower set to earth. The line is therefore put to earth after each signal impulse for a period (the holes and spaces being of the same size) equal to the duration of contact between the line and the battery. By thus discharging the line a rapid rate of transmission is permissible. By the insertion of a relay in the circuit of the third pair of contacts in the manner hereinafter described the receiving station may stop the sending instrument or signal for its stoppage. This may be accomplished by simply opening the line at the receiving end. This is an important function, without which as heretofore in case of accident or any mishap at the receiving end, there was no way to stop the sender until the entire tape had been run through the transmitting instrument. Now it is possible to stop the transmitter instantly. The relay coils during transmission are traversed by the discharge currents coming from the line. If, however, the relay be so adjusted that its armature will not respond to these discharge currents, or is adjusted above them, the mere opening of the line at the receiving end will increase the amount of the discharge current passing through the relay sufficiently to actuate its armature, and through the local circuits and parts under its control, stop the transmitter.

I am aware that it has been common to discharge circuits at the transmitting end by use of leaks to earth, and that electro-magnets have been used in derived or shunt circuits for the purpose of following up each signaling impulse with a current of opposite polarity created by the self induction of the electro-magnet. A relay used in this way could be made to control the transmitting instrument in the manner described as well, but it will be obvious that a large portion of the signaling current would be wasted by such an arrangement and the signals depleted at the receiving end, while with the middle contact plan there is no loss of working current, simply a utilization of the discharge current as it is being rendered harmless to transmission. The relay in this discharge circuit may be shunted to the proper limit so as to facilitate discharge of the line. In chemical telegraphy the well known method of cutting off the tailing of signals by the self induction of electro-magnets placed in a shunt circuit around the receiver may be dispensed with, or the shunt circuit made so high in resistance as to divert but comparatively little current from the recorder, so that the signals will be unimpeded and practically unimpaired owing to the discharge of the line at the transmitting end.

Another feature of my invention consists of a device for winding on a spool the tape as it comes from the instrument at the receiving end of the line, so that it may be handled quickly and with facility. For this purpose I employ a spool having pins projecting longitudinally with the tube part which slips over a spindle frictionally carried by the motor which draws the tape from the supply roll. The friction is so regulated that the tension put upon the tape by the stoppage of the receiver or by the increasing diameter of the roll will not break it. The use of this winding device requires that the transmitting tape be put through last end first, which, inasmuch as this tape is also wound on a reel as it comes from the perforator, is a convenience rather than an obstacle.

In a previous application filed by me April 21, 1896, patented January 19, 1897, No. 575,419, I have shown and described a way of stopping the tape at the receiving station immediately upon the completion of transmission. This stoppage to be permanent required the operator to immediately raise the lever carrying the feed roller into its locking position. In this application I show and describe means for automatically throwing the lever to its locking position, and also for again releasing it so that it will be automatically thrown down and draw the tape as soon as transmission begins. This is effected by the same relay which operates the stopping local magnet and the reel brake magnet, and is under control of the operator managing the transmitting machine. This insures simultaneous starting of the receiving and transmitting instruments, prevents false starts or waste of time and tape, and in conjunction with the automatic stoppage of the receiver renders the control of the circuit as complete and instantaneous as in the Morse system.

Another feature of my invention consists of coating the iron wires of the chemical recorder so as to prevent rusting. I have discovered that the rust or oxid is not as sensitive to the electrolytic action as the pure metal and that it tends to blur the signals and scrape the tape. To overcome this I treat the wires to a very thin coating of copper or silver or other non-oxidizable metal, preferably silver—such as might be produced by a few seconds immersion in a solution of sulfate of copper or silver, so that while the coating is sufficient to prevent rusting its structural strength is not sufficient to interfere with the even wear of the wire itself. This also prevents unnecessary spreading of the characters by reason of the ends of the wires being more or less embedded in the tape, and produces clearer and cleaner cut signals. Such a coating not only protects the wire fingers from the atmosphere, but also from the action of the chemical solution with which the receiving tape is saturated.

In the accompanying drawings, Figure 1 is a diagrammatic view of the transmitter; Fig. 2, a similar view of the receiver; Fig. 3, a detail longitudinal section through the reel upon which the receiving tape is wound as it leaves the recording fingers; Fig. 4, a view of a length of the transmitting tape, and Fig. 5, a view of one of the receiver recording fingers.

The transmitting instrument is shown in Fig. 1. The main line L, at the transmitter is connected to a switch G which in the position shown directs the main line circuit through a set of Morse instruments and a transmitting battery to earth. There is a similar set of Morse instruments at the receiver end that may in like manner be connected with the main line so that the circuit is available for Morse transmission when so connected. When the switch G is thrown to the left against contact $g$, the circuit through the Morse instruments is opened and the main line circuit is directed to the upper brushes G' of the transmitter. These brushes are electrically connected as indicated and are mounted in a pivoted block of insulating material operated as hereinafter described. Of course a single broad brush would be the obvious equivalent of the brushes shown. I prefer to use separate brushes as they produce less friction. A corresponding set $G^2$ of individually insulated brushes is arranged opposite and beneath the set G' and below the trough or guide-way H over or through which the perforated transmitting tape is drawn. Of the lower brushes, that marked $g'$ is connected with the positive pole of the main battery M B whose center is connected to earth. The middle brush $g^2$ is connected to an adjustable contact stop $g^3$ against which an insulated yielding finger $g^4$ on the end of the armature lever I of a magnet I' rests when the lever is drawn against its back stop by its retractile spring. The insulated finger $g^4$ is connected through a relay K to earth, and in a shunt around this relay is a rheostat K'. The remaining brush $g^5$ is connected with the back-stop $I^2$ of the magnet I' and the heel of the armature lever of this magnet is connected with the negative pole of the main battery M B. In the trough H is a slot $h$ immediately beneath one end of a pivoted lever H'. There is also a slot or opening $h'$ in a trough within which and below the face of the bottom of the trough is the head of a key lever H², connected with the negative pole of the main battery and adapted to be depressed against a contact stop h² that is connected to one (h³) of a pair of insulated parallel contact plates h³ h⁴ normally out of contact, and the latter one of which is connected with the main line. Relay K closes at its front stop the circuit of a local battery L B', which includes the coils of a magnet L, whose armature lever L' is formed with a shoulder adapted to engage a corresponding shoulder m projecting from an endwise reciprocating bar M, having a spring m' that tends normally to draw it in a direction away from the armature lever L'. The switch lever G, in the construction shown, is also the lever for operating the endwise moving rod M which has a pin engaging a slot in the lever.

In Fig. 1 the automatic transmitter is shown disconnected from the main line and the bar M has been drawn to the right by its retractile spring m'. Assuming now that a message is to be automatically transmitted from a perforated tape, for instance, a tape perforated in the manner indicated in Fig. 4 or otherwise. The unperforated end of the tape is passed through the trough H under the lever H', between the opposed brushes G', G² and between the feed rolls N and N'. In this instrument the lower feed roll N may be constantly running, being driven by a suitable motor as for instance an electric motor, and the upper or pressure feed roll N' is thrown upwardly by a pivoted lever N², a projection upon which acting upon the end of the pivoted lever carrying the roll N' holds the roll up against the tension of its spring n. This lever N² is slotted and the slot is engaged by a pin on the horizontal movable bar M and the upper end of the lever in the position shown is adjacent to the lower one of the pair of parallel contact plates h³ h⁴. The paper tape having been inserted as described the lever G is thrown to the left so as to come against the contact g, thus disconnecting the Morse instruments and throwing the automatic transmitter into circuit. The effect of this movement is to throw the bar M to the left against the tension of its retractile spring and the shoulder m thereon engages the corresponding shoulder on the armature lever L' thus holding the bar M in its new position. The results following this movement of the horizontal bar are as follows:—A pin on the bar leaves the upper arm of the lever H' and permits the spring attached to this lever to draw its lower arm down against the face of the paper tape, which holds it against further descent—this device is for the purpose of preventing the short-circuiting of the main battery after the transmitting tape has been completely through the machine, and the operation will be presently described, though it is not claimed herein, as it has already been claimed in my Patent No. 575,419. At the same time the pin on the bar M leaves the tooth or projection of the pivoted block in which the upper contact fingers G' are mounted, and the block is drawn down by its spring so that the upper fingers press against the paper tape with such tension that they will respectively make contact through the perforations in the tape with the corresponding fingers of the lower set. At the same time the lever N² is swung to the right, thus liberating the upper pressure feed roll N', which is then thrown down by its spring with a yielding pressure upon the tape lying on the face of the continuously running roll N, and the automatic traverse of the transmitting tape through the machine will be commenced. At the same time, however, the upper end of the lever N² has come against and passed beyond the lower contact plate h³ and in this movement has forced such contact plate upwardly against upper plate h⁴ and established a circuit from the main line through the plates h⁴ h³ to the anvil h² of the manual key H². The operator at the time of effecting these movements will have depressed the key H² with his finger and consequently the main line circuit is completed through the key to the negative pole of the main battery and thence to earth, and a current from this pole of the battery is for a brief interval sent into the line. This impulse so sent is used to automatically start the receiver. The central transmitting brushes of the upper and lower set are longer than the other brushes, beyond the ends of which they extend. When the brush g' makes contact with its corresponding brush a positive signaling current is sent to line, and when the brush g⁶ makes contact with its corresponding brush a negative signaling current is sent to line, and the signals so transmitted are recorded in any suitable manner at the receiving end of the line, a chemical receiver being shown. Immediately after each signaling impulse, whether negative or positive, has been sent into the line and before the next signaling perforations have come under the signal transmitting fingers the center perforation in the tape will come between the central elongated brushes and the line will thus, momentarily, after each signaling impulse be put to earth, the circuit being from the center brush of the upper set to the center brush of the lower set, thence to the contact g³, insulated contact finger g⁴ carried by the armature lever I, and thence through the coil of the relay K, and the rheostat in shunt with it to earth. This operation is one of the leading features of my invention and the organization permits the grounding of the line to permit the discharge thereof, after each impulse irrespective of the speed at which the transmitting tape may be passed through the instrument. In this simple way I attain this result without the use of electro-magnets or special instruments which however I believe would be found to be inefficient for the purpose at high speeds of transmission.

It is obvious that the perforations in the tape may be placed further apart and the center perforation through which the line is grounded be formed in rear of each signaling perforation, in which event the ends of the three fingers in each group of transmitting fingers might be arranged in the same transverse line, but I consider that such an arrangement is not so desirable as that shown and described, among other reasons, because the length of tape required for the punching of a given message thereon would be very materially and unnecessarily increased.

Another feature of my invention is the stoppage of the transmitter at the will of the receiving operator, which might be desirable in the event of any difficulty of or obstruction to the proper reception of the matter being transmitted. This feature in the operation of machine telegraphy, I believe to be broadly new. In the accompanying drawings I show a special way of effecting it in which I utilize the relay K through which the line is grounded, after each signaling impulse has been sent into it. The rheostat K' in the shunt around this relay may be adjusted and the retractile spring of the relay armature also so adjusted that under the normal and proper working of the system the current discharged from the line each time that it is grounded between the signaling impulses will not sufficiently energize the relay to cause the attraction of its armature, but so that the armature will be attracted upon an increase of strength of the current passing to earth.

It is well known that when a line is put to earth to discharge static or tailing currents at one end only there is a considerable augmentation of the current thus discharged at one end over the current that would be discharged if the line were grounded at both ends, and I have demonstrated that I can obtain such increase of current as to allow a proper margin for the operation of the relay K merely by opening the line at the receiving station. When therefore the receiving operator desires to stop the transmitting instrument and has caused, as described, an increase in the strength of the current traversing the coils of the relay K, the armature lever of the latter passes to its front stop, completing local battery L B' through magnet L, which attracts its armature and disengages the shoulder thereon from catch $m$ on bar M, which is retracted by its spring, and the parts of the instrument pass into the position indicated in the drawing, and the two operators may then communicate by means of their Morse instruments.

When the transmitting tape has completely passed through the transmitter, the lower arm of the lever H' falls through the slot in the channel H and its upper end comes against a contact $H^3$ thus completing the circuit of the local battery L $B^2$ through coils of magnet I', which attracting its armature opens the circuit between its armature lever and its back stop $I^2$ and prevents short circuiting of the main battery through these contacts, lower brush $g^6$, upper brushes G' and brush $g'$. Contacts $q^3$ $q^4$ are also separated preventing short-circuiting of the upper half of the main battery, through the lower center brush, upper center brush, lower brush $g'$, ground, K K', and $q^4$, $q^3$. At the same time such half of the main battery remains to line and transmits a prolonged impulse which effects automatic arrest of the receiver as presently described.

The receiver is shown in Fig. 2. The main line L runs to a switch O that may occupy either of two positions. In one position it is closed upon the contact that is connected through a set of Morse instruments and battery to earth. When closed upon another contact as indicated in the drawing, the main line circuit extends to the finger or fingers for producing either the dot or dash record, while the other finger insulated from the first named is connected to earth. In the drawing, I have shown three fingers, two of which are electrically connected and between them a third which is the insulated finger connected to earth. The arrangement shown is one for chemical reception and is that set forth in my United States Patent No. 541,967, dated July 2d, 1895. The chemically prepared receiving tape P is shown as passing from a suitable reel over a drum P' that may be constantly rotated by a suitable motor, and the chemical reception of the transmitted message effected according to the well-known method. The switch O also completes a branch circuit from the main line through a polarized relay P R to earth and this circuit may include a rheostat $Rh$ for purposes of adjustment, as is well understood. For the same purpose I place a rheostat in shunt around the polarized relay. The armature lever $p$ of the polarized relay is maintained neutrally or midway between two contact stops $p'$ $p^2$, and does not respond to the normal signaling currents, but does respond to special currents as hereinafter described. A local battery L $B^3$ has one pole connected with the armature lever $p$ and the connection from the opposite pole is branched, one branch passing through the coils of a magnet Q, and thence to the stop $p^2$ of the polarized relay, and the other branch through the coil of a magnet R, and the magnet U and thence to the contact stop $p'$ of the polarized relay. The receiver contains a movable bar or device S that a retractile spring normally tends to urge to the left as viewed in the drawing, and carries upon its end a latch or catch s that is engaged by a similar catch on the armature lever of the magnet Q when such lever is retracted. The signal recording fingers are mounted in a pivoted insulated block S' having an arm to which a spring is connected that tends normally to rock the block S' and throw the receiving fingers down upon the tape. When, however, the bar S is held by the latch s against the strain of its spring (which is the position shown in the drawing) a pin s' on the bar acts upon the block S' to throw the fingers up out of contact with the tape. The pressure roller S² is carried upon a pivoted lever S³ that is provided with a spring tending normally to throw the roller down upon the tape, but is prevented by pin s³ on bar S. In this condition of the apparatus the receiver is ready to be started by the operator at the transmitting end of the line. When, therefore, in starting the transmitter an impulse of current is thrown upon the line in any suitable manner, as for instance by the depression of the key H² and the establishment of electrical contact between $h^3$ $h^4$, this impulse of current which is of proper polarity energizes the polarized relay P R and causes the movement of its armature lever to the contact stop $p^2$, thus closing the circuit of local battery L B³ through the coils of magnet Q, which attracts its armature, releasing the catch s and permitting the throw of bar S to the left. Pressure roller S² descends upon the tape and roller P' being caused to revolve, the tape is drawn forward under the recording fingers, which are by the same movement thrown down upon it. The tape with the transmitted message recorded thereupon may be wound upon a suitable receiving reel V, as presently described. At any time during the transmission of a message, the receiving operator may if he desires arrest the transmitting instrument and as before stated one way in which this may be accomplished would be to move the switch lever O into a central position between its two contacts, thus breaking the main line circuit and by so doing augmenting the discharge of current through the relay K, Fig. 1, and effecting arrest of the transmitting instrument.
When the transmitting tape has passed from under the end of the lever H' and from between the brushes G', G², that lever drops as described and prevents short circuiting of the main battery. At the same time there is sent into the line a prolonged impulse of current that energizes the polarized relay P R and is of such polarity as to cause the passage of its armature lever p from its central or neutral position to the contact p', thus completing the circuit of the local battery L B³ through the coils of the magnet R, causing it to attract its armature lever r which striking the end of the bar S moves it to the right and causes the latch s thereon to engage with the catch on the armature lever of the magnet Q. At the same time the brake magnet U, which is in the same local circuit with the magnet R is energized, attracts its armature lever, and the brake U' is applied to the tape delivery reel U². The receiving operator may now move the switch O so as to throw the Morse instruments into circuit if he so desires, and communicate with the transmitting operator, and the receiving instrument is in condition to be started automatically from the transmitter to effect the record of another message. When the tape has run out of the transmitter the operator should move switch lever G to connect his Morse instruments into the circuit, as also should the receiving operator when his instrument is arrested. On the shaft of the drum P' is a pulley P² which is belted to a pulley P³ on the shaft P⁴ which carries the receiving reel V. There is frictionally attached to this shaft by any suitable means, many devices for that purpose being well-known, a ratchet wheel P⁵ having a sleeve P⁶ that may embrace the shaft. The reel V is indicated in Fig. 1 and is shown in detail in Fig. 3. It is shown as consisting of a head from which there extends axially a sleeve V' adapted to be slipped over the sleeve P⁶ and be held frictionally thereon. From the head V a series of parallel arms or rods v, four being shown, extend in the same direction as the center sleeve V', and are located at a suitable distance diametrically from the sleeve. The receiving tape as it leaves the recording devices is wound upon this reel. The ratchet wheel P⁵ on the shaft P⁴ is, when the receiver is out of action, locked by a lever W having a projection or pawl upon its end that engages one of the teeth of the ratchet, the lever being held in the position to lock the ratchet by the stress of its spring w. When, however, the receiver is thrown into action, a pin w' on the pressure roller lever S³, acting on the end of the lever W disengages its opposite end from the ratchet wheel. When the receiver is out of action as indicated in Fig. 2, the shaft P⁴ may be continuously driven by the belt from the pulley P², but the ratchet wheel frictionally connected with the shaft and the receiving reel frictionally connected with the sleeve of the ratchet wheel will remain at rest. The end of the tape P may, as shown, hang down between two of the pins r of the receiving reel. When the receiver is thrown into action the ratchet wheel is unlocked and the receiving reel commences to revolve and winds the tape thereupon as it passes from the drum P'. The frictional connection of the receiver reel with the parts driving it is such as not to break the paper, and the speed of rotation of the reel is such as to keep the paper tape smooth and taut.

Fig. 5 illustrates one of the iron wires or recording fingers of the chemical recorder, being for clearness of illustration shown on an enlarged scale. The wire is covered with a very thin coating of non-oxidizable material, preferably a metal such as copper or silver. This coating is marked 3 and the central part or body of the finger, which is of iron, is marked 4. I have stated the purpose and utility of this coating of the iron finger with a non-oxidizable material, and further description is unnecessary.

I claim as my invention:

1. In an automatic telegraph transmitter, the combination of signal transmitting devices adapted to send currents corresponding with perforations in the tape, line grounding devices, a circuit connection therefrom to earth through which the line is grounded correspondingly with other perforations in the tape immediately after each signaling impulse, an electro-magnet in said ground circuit connection, the electro-magnet being adjusted so as not to respond to the discharge current that normally passes to earth, but to be actuated by an augmentation in the strength of such current, a local circuit controlled by said electro-magnet, an electro-magnet included in said local circuit, and means for arresting the passage of the transmitting tape through the instrument when the last named magnet is energized.

2. In an automatic telegraph transmitter, the combination of signal transmitting devices adapted to send currents corresponding with perforations in the tape, line grounding devices, a circuit connection therefrom to earth through which the line is grounded correspondingly with other perforations in the tape immediately after each signaling impulse, an electro-magnet in said ground circuit connection, the electro-magnet being adjusted so as not to respond to the discharge current that normally passes to earth, but to be actuated by an augmentation in the strength of such current, a local circuit controlled by said electro-magnet, an electro-magnet included in said local circuit, means for arresting the traverse of the transmitting tape through the instrument, disconnecting the transmitter from the line and completing the circuit of the line through Morse instruments when the last named magnet is energized.

3. In an automatic telegraph system, a transmitter having grounding devices, a circuit connection to earth to ground the main line circuit at intervals, an electro-magnet in said ground connection adjusted so as not to respond to the normal current discharges to earth, but so as to respond to discharges to earth of increased strength, and electro-magnetic devices controlled by said magnet for automatically suspending the automatic transmission when a current discharge of increased strength actuates said electro-magnet.

4. In an automatic telegraph system, the combination of a main line, a perforated tape having three parallel rows of perforations, two brush or finger transmitting devices for transmitting signaling currents over the main line through two of said rows of perforations, brush or contact finger devices connecting the line to earth through the third row of perforations, an electro-magnet, its electrically divided armature lever, contacts against which the parts of the armature work, circuit connections whereby the circuit of one of the current transmitting fingers or brushes and the circuit of the grounding brush devices are completed through the electrically divided armature lever, a local circuit including said electro-magnet, and means for completing such local circuit when the perforated transmitting tape has completed its traverse through the transmitter, whereby said contact brush circuits are opened and short-circuiting prevented.

5. The combination of a chemical receiver, a tape automatic transmitter of currents of reverse polarity and a main line connecting them, electro-magnetic transmitter arresting devices and means located at the receiver whereby the receiving operator may at will actuate said electro-magnetic devices to arrest actuation of the transmitter.

6. The combination of a chemical receiver, a tape automatic transmitter of currents of reverse polarity and a main line connecting them, electro-magnetic receiver starting devices, means located at the transmitter whereby at the will of the transmitter operator said devices may be actuated to effect the simultaneous starting of the receiver and the transmitter, electro-magnetic transmitter arresting devices and means located at the receiver whereby the receiving operator may at will actuate the transmitter arresting devices to stop the transmitter.

7. In an automatic telegraph system, the combination of a main line, a receiving instrument and a tape automatic transmitting instrument connected therewith, means whereby the receiving instrument is automatically started at the time of the start of the transmitting instrument by an impulse of current sent over the line, means whereby the action of the transmitting instrument may be arrested at the will of the receiving operator, and means whereby the receiving instrument is automatically arrested when the transmitting tape has completed its traverse through the transmitting instrument.

8. In an automatic telegraph system, the combination of a main line, transmitting and receiving instruments connected therewith, a polarized relay in the circuit at the receiving station, its neutrally maintained armature, this relay being adjusted so as not to respond to the signaling impulses but so as to respond to more prolonged impulses of current, electro-magnetic devices for automatically starting the receiver when a prolonged current of one polarity traverses the coils of the polarized relay, and electro-magnetic devices for automatically arresting the action of the receiver when a prolonged current of reverse polarity traverses the coils of said relay.

9. In an automatic telegraph system, the combination of a main line, transmitting and receiving instruments connected therewith, electro-magnetic devices in the main line in branch or shunt-circuit with the receiver at the receiving station, said devices being so adjusted as not to respond to the normal signaling currents, but so as to respond to prolonged currents, means for sending from the transmitting station at the time of starting the transmitter a prolonged impulse of a given polarity to actuate said electro-magnetic devices, local circuit electro-magnetic devices then controlled thereby for automatically throwing the receiver into operation, and means at the transmitting instrument for sending a prolonged current of opposite polarity when the transmission of the message has been completed to actuate said main line electro-magnetic devices in reverse direction, and other local circuit electro-magnetic devices then controlled thereby automatically arresting the receiver.

10. In an automatic telegraph system, the combination of a main line, transmitting and receiving instruments, a relay in the line circuit at the receiving station, means for sending from the transmitting station a current of suitable character and polarity to actuate such relay in one direction, a local circuit thereby completed and including electromagnetic devices for automatically throwing the receiver into operation, means at the transmitting station for sending a current of reverse polarity to actuate the relay in the reverse direction, a local circuit that is then completed, and electro-magnetic devices therein for automatically arresting the action of the receiver.

11. In an automatic telegraph receiver, the combination of the delivery reel, a driven shaft, a receiving reel removably frictionally mounted thereon, recording devices located between the two reels, means for automatically throwing the receiver, including the receiving reel, into operation from the transmitting station, means for automatically throwing the receiver out of operation from the transmitting station, and a detent for arresting the rotation of the receiving reel when the receiver is thrown out of operation.

12. In an automatic telegraph system, the combination of a main line, a receiving instrument and a tape automatic transmitting instrument connected therewith, means whereby the receiving instrument is automatically started at the time of the start of the transmitting instrument by an impulse of current sent over the line, and means controlled by the transmitting tape whereby the receiving instrument is automatically arrested when the transmitting tape has completed its traverse through the transmitting instrument.

13. The combination with the parts of an automatic chemical receiver, of a signal recording finger, composed of iron having a thin coating of non-oxidizable material thereupon.

14. The combination with the parts of an automatic chemical telegraph receiver, of a signal recording finger composed of corrosive metal having a thin coating of non-corrosive metal thereon.

In testimony whereof, I have hereunto subscribed my name.

PATRICK BERNARD DELANY.

Witnesses:
FRANK S. OBER,
EDWARD C. DAVIDSON.